July 5, 1938.                    L. H. BROWNE                    2,123,074
                               MOTOR CAR CONTROL
                              Filed Nov. 6, 1933                3 Sheets-Sheet 2
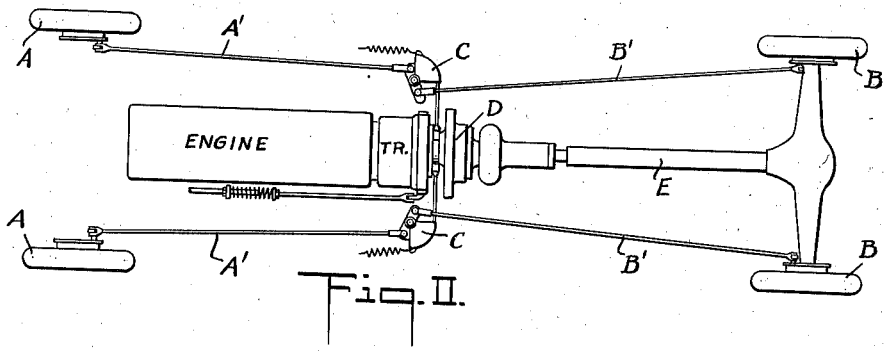
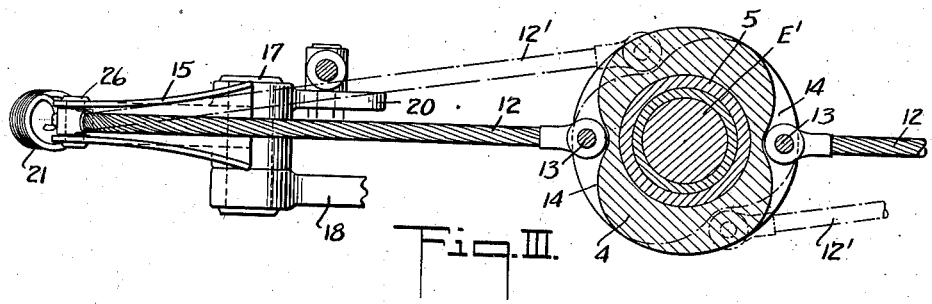
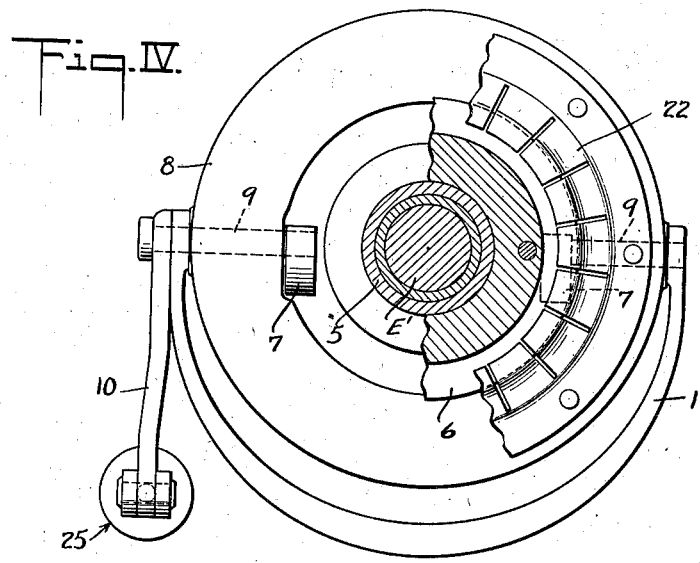
INVENTOR
LINDSAY H. BROWNE
his ATTORNEY July 5, 1938.    L. H. BROWNE    2,123,074
MOTOR CAR CONTROL
Filed Nov. 6, 1933    3 Sheets-Sheet 3
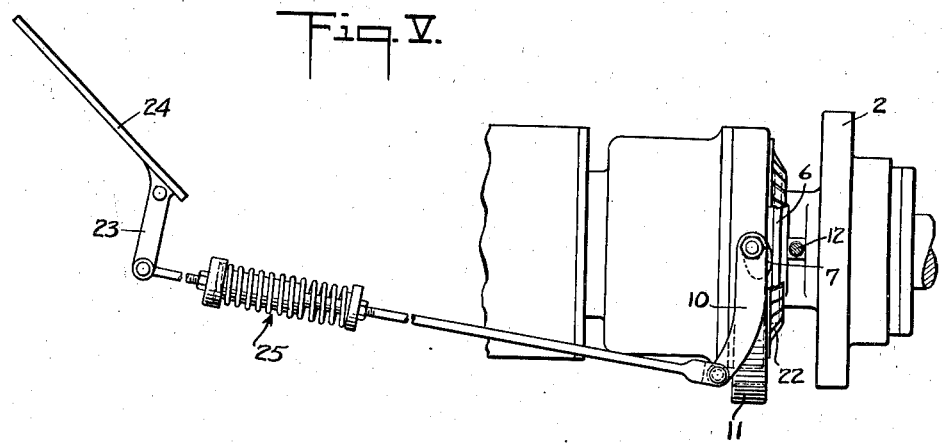
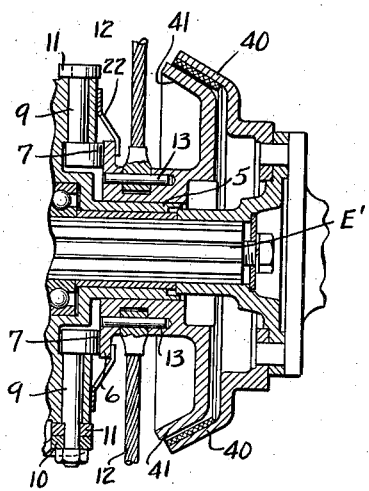
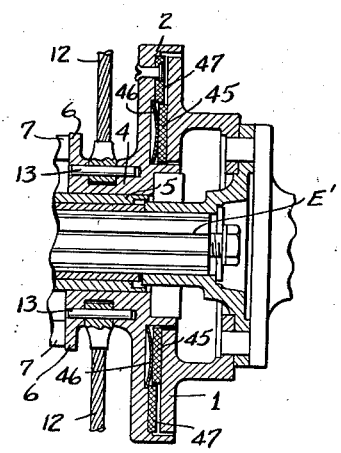
INVENTOR
LINDSAY H. BROWNE
BY
his ATTORNEY Patented July 5, 1938

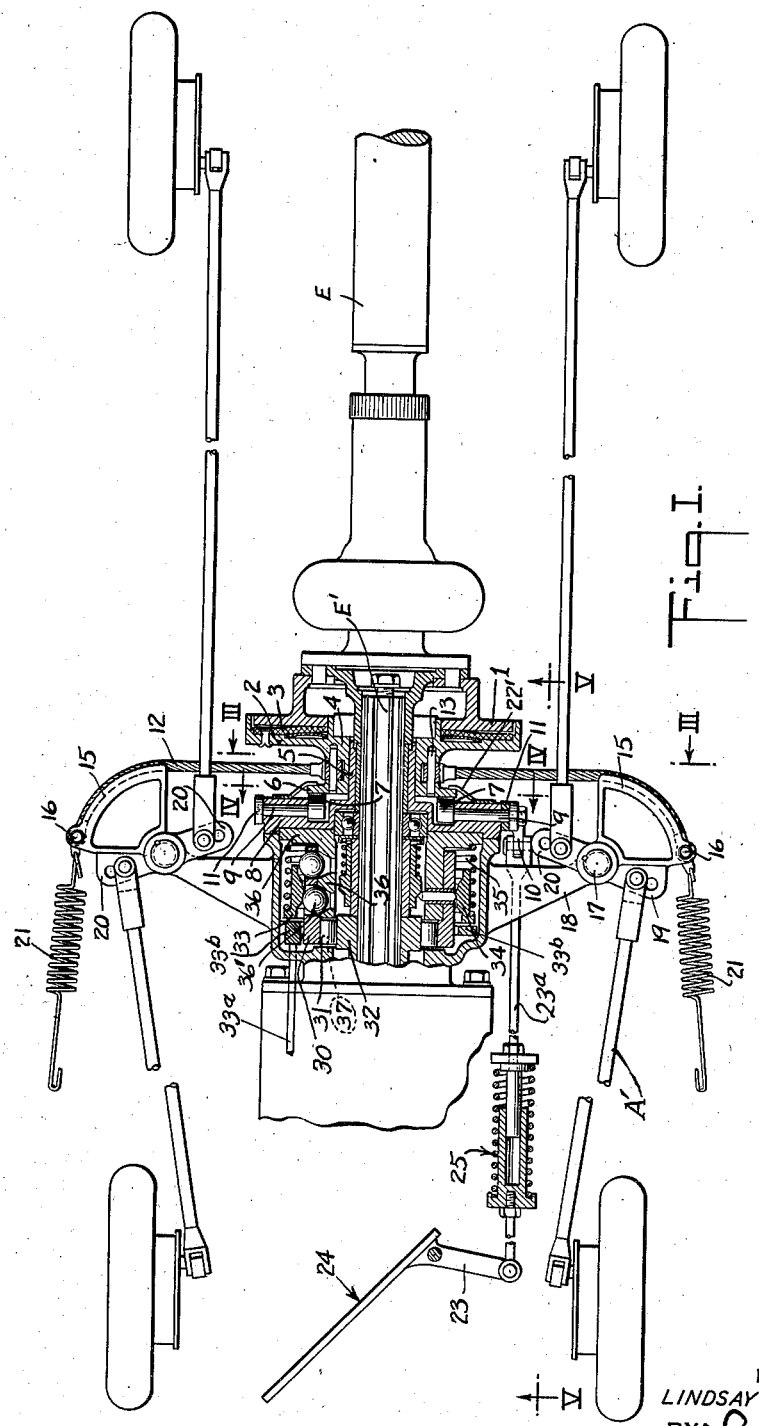

2,123,074

UNITED STATES PATENT OFFICE 2,123,074

MOTOR CAR CONTROL

Lindsay H. Browne, Rochester, N. Y., assignor to Josiah Anstice & Co. Inc., Rochester, N. Y., a corporation of New York Application November 6, 1933, Serial No. 696,763

13 Claims. (Cl. 188—140)

This invention relates to the control of automobiles or like vehicles, and in the form hereinafter described, relates in particular to the braking control.

The braking control involves the retardation when the car is either in forward or rearward movement, and even under desired conditions the holding of the car stationary. Usual brake equipment provides for retardation of either forward or reverse speed, but in the rearward direction or reverse direction of motion the usual aim is to bring the car to a stop, and to hold it against rearward motion.

For the most efficient and more effective accomplishment of the desired results, I provide a combination of what is now well understood as a roll back stop cooperating in its functioning with what is generally referred to as power brake. This combination makes possible a relatively simple construction of power brake that will function practically, both for braking on forward or reverse movement of the vehicle.

I therefore provide a roll back stop which is automatically shifted into condition when the car is rolling forward to automatically prevent the car from starting back rolling as soon as there is a tendency to roll back, as when the car stops on a grade, so that the instant holding of the car against any back rolling is wholly effected, and automatically under that condition making ordinary brakes with amplifying means or not, unnecessary at that particular time. It eliminates the necessity of the amplifying or power brake feature when the car is stopped on a grade after forward motion, and then should it be desired to allow the car to drift backward, or to drive the car backward my combination provides for the setting into proper functioning condition of the power brake construction. In the particular form hereinafter shown it means taking up the slack gradually as the car moves rearward from the state of rest. Then when the car is brought to a stop and again forward drive is desired, the forward motion of the car releases the back roll stop from its non-functioning position and sets it to automatically function thereafter as soon as the car again stops and tends to roll backward. The power brake is in condition to function at all times when the car is in motion.

Various features of my invention may however be used without the combination in the motor car control of the back roll stop. The power brake features afford means of simple and effective construction suitable for brake actuation through any of the various brake-rigging connections or linkage. In a case where all brake rods are actuated through a single cross shaft, only one additional arm or lever attached to the cross shaft may be connected to a tension member on my power brake mechanism, which provides in the simplest form for the application of my invention to existing or standard forms of construction.

As will be hereinafter more particularly described, these various features alone or in the combinations either shown or described, will have advantages apparent from the disclosures in this application, or as will be more particularly realized in the practice of any of these inventions.

Thus I may use a back roll stop construction as shown in my co-pending applications, as, for example, Serial No. 649,890, filed January 3, 1933, Serial No. 648,533, filed December 23, 1932, and Serial No. 695,479, filed October 27, 1933, which applications have been allowed and will presently mature into patents, said copending applications having matured respectively as Patents Nos. 2,038,983, 2,038,985, 2,038,987, all granted April 28, 1936. I couple therewith means whereby the initial application of the regular brakes causes an increased or multiplied force due to a clutch actuated by the momentum of the car, in either direction. While the momentum of the car transmits the multiplied force by a friction clutch providing the added strain but without revolving the brake actuating mechanism, this added strain is in the forward direction—or the rear direction depending upon whether the brakes are applied when the car is moving forward or is moving rearward. Therefore the simple construction to add the power due to the movement of the mass of the vehicle requires connections that will function whether the tendency is to turn the parts in one direction or the other. The change to cause the proper application of the power brake would ordinarily require a complication or a time-element to permit the mechanism to shift for functioning in one direction or the other, and that necessity is avoided by my combination of the power brake with the automatic back roll stop. It thus assures the positive braking or locking against back rolling, without the necessity of calling upon the power brake, but if desired to intentionally or voluntarily drive rearwardly, the release of the back roll stop provides the time-element for the readjustment of the power brake, setting the power brake thereby immediately in position to function when it is desired to check, retard or stop the rearward movement of the mass of the car. Then again, there is no requirement on the power brake when forward drive begins, and the time-element is provided for a readjustment of the power brake mechanism, in order that it may become instantly operative when forward drive braking is desired.

By this combination of structure I provide a simple power brake functioning with certainty and efficiency in combination with a suitable roll back stop, which meets all the conditions of practical operation in the control of braking of the car whether forward or rearward driving.

Fig. I is a horizontal cross-section of the principal elements of the power brake with associated parts and brake-rigging in full.

Fig. II is a diagrammatic plan view of an automobile chassis indicating the general arrangement of power brake and brake-rigging.

Fig. III is a vertical cross-section on the line III—III of Fig. I on a larger scale.

Fig. IV is a vertical cross-section on the line IV—IV of Fig. I on a larger scale.

Fig. V is a side elevation of Fig. IV on the line V—V of Fig. I.

Fig. VI is a modified form of power brake clutching unit.

Fig. VII is a section of the disc clutch shown in Fig. I, in modified form.

The form of embodiment of my invention shown in the accompanying drawings and herein specifically described, it will be understood is subject to many variations and modifications within the scope of the claims of this application. In general, the diagrammatic chassis plan in Fig. II shows front wheels with brakes A and rear wheels with brakes B, and brake rods or cables A' A', B' B', which are actuated by any suitable operating levers or bell-cranks C—C, from a power brake mechanism D which is, in the form shown, located adjacent the change speed transmission, which in turn is behind the engine. The drive shaft or propeller shaft E extends in the usual way to the rear axle housing to drive the rear wheels, and is coordinated with the power brake mechanism D, as will now be more fully described.

In Fig. I the wheels and brake-rigging may be as shown and above described in Fig. II, and the actuation and connections of the power brake mechanism D involve the cooperation of an automatic back roll stop with the frictional power brake, sometimes called servo-brake, although the power brake mechanism in itself may be used under certain conditions without the roll back stop. However, when these two structures are combined they assure coordination, which in some respects may be regarded as a substantial refinement of control of the automobile for assuring the stopping of the car, or holding of the car against back rolling, with more exactness, that is with less leeway of movement of the car, than would be possible with other power brake mechanism. Furthermore, the very simple form of power brake construction, involving advantages in simplicity, dependability, economy of construction, and maintenance, involves a slight back lash or lost motion when the power brake is shifting to function from forward to rearward movement of the car, in other words, to stop forward driving or when used as a backing brake. Such slight back lash or lost motion may be taken up entirely, that is its effect upon the actual movement of the car in practical operation, can be eliminated by the combination of the automatic back roll stop.

The drive shaft E has a disc clutch flange 1 mounted to rotate with the drive shaft, suitably connected with what is referred to as the propeller shaft or the shaft driving the rear wheels, and therefore having rigid rotative connection with the driving road wheels, so that the flange or clutch plate 1 will always turn with rotation of the road wheels, and therefore subject to the movement of the mass of the motor car.

For frictional clutch cooperation with plate 1, a flange 2 having suitable braking or disc clutch surface 3 forms a rigid part of a hub 4 mounted on a sleeve 5, around the shaft section E'. This hub is free to rotate without any connection with the shaft E', and has a flange 6 engaged by cams 7 mounted in a fixed portion 8 of the transmission or other suitable housing, by means of cam shafts 9 actuated by lever 10 suitably connected for voluntary control from a foot pedal or the like. The cam shafts 9 are connected by a yoke 11, so that the voluntary actuation through lever 10 on one side, turns both cam shafts, and thereby actuates both of the cams 7 to force the flange 6, and thereby its associated hub 4 and the clutch or disc-braking surface 3 into contact with the flange 1 rotating with the driven shaft. Thus voluntary action on the foot pedal turns the cams 7 the desired degree to force the clutch contact, the amount desired for proper braking control of the car, whereby a rotary turning moment is transmitted to the flange 2 and the hub 4, which however cannot rotate but are turned a limited angular extent, limited by the actuating mechanism connecting it with the brake-rigging.

This actuating mechanism consists of cables 12, which are pivotally secured by the pins 13 at diametrically opposite points or sockets in the hub 4 adjacent the pinned ends of the cables 12, that is the anchorage of the cables to the hub 4, the surface of the hub is recessed as shown at 14, Fig. III, so that the end of each cable can turn on its anchorage pin 13, and as the hub rotates slightly the cable will lie on the adjacent surface of the hub permitting a slight wrapping of the cable on the hub, while tension is transmitted to the cable due to the force of the friction clutch tending to rotate the hub 4. The tension or strain so transmitted to the cables 12—12 is carried to a sector 15, around which the other end of each cable is wrapped and anchored as at 16. This sector is mounted on a fixed pivot 17 carried by an arm from any adjacent fixed housing, such as 18. Rigidly associated with the sector 15 or with its hub, are brake levers or brake rod links for transmitting the desired braking force to the brake rods A' A', B' B', or brake cables, or any other desired form of brake-rigging. In the form shown, the sector 15 has lever arms 19—20 integrally formed and positioned at the proper angle with respect to the grooved sector or segmental sheave, so that with the oscillation of the sector due to tension on the cable 12 the brake levers are moved into position most effectively transmitting tension to the brake cables or bars. At a suitable place on the sector a return-spring 21 is secured with its fixed end attached to a fixed part on the vehicle, for the purpose of always returning the sheave to the "off" position of the brake, and consequently putting tension on the cables 12—12 so that they are held without any slack from their anchorage 13 on the hub 4, to their anchorage 16 on the sector.

When the cams 7—7 are not forcing the flange 6 for clutch-engagement, separate springs 22', or a suitable one piece spring such as shown at 22 in Fig. IV, engages the outer side of flange 6 being mounted on a fixed part of the adjacent housing, so that there is always a tendency to hold the flange 6, and therefore the hub 4 and clutch plate 2 in engagement with the cams 7, and when the latter are not turned voluntarily to force the flange 6, the spring action holds the flange 2 and the friction surfaces 3 out-of-contact with the driving shaft plate 1, thus preventing any drag or frictional loss or wearing of parts.

While I have referred to cables 12, in the particular form herein illustrated, the connections from the power brake hub to actuate the brake-rigging may be chains or they may be flexible straps, or other suitable forms of construction best suited to meet the various conditions of design involved in any particular embodiment of my invention.

The voluntary action of the driver for the braking control of the car, comprises setting the power brake into functioning by causing the desired degree of reaction by the friction clutch, as the engagement between the flange 1 and friction surfaces 3, in order to produce the rotative moment applying tension to the cables 12, which as stated is effected by actuating the lever 10 to turn the cam shafts 9—9. This is effected by the rod or link 23ª actuated by lever 23 moved by the foot pedal 24. The link 23ª, however, I prefer, when it constitutes a thrust rod, to supply with a yielding or cushioning section 25. As illustrated, the foot pedal and its lever are shown turned ninety degrees out of their true plane, and the cushioning means 25 consists of a telescoping section with a compression coil spring enclosed, with suitable collar or other adjustment means, the functioning of which consists of permitting a depression of the pedal until the rod 23ª actuates the cam 7—7 to an extent causing the power brake disc pressure necessary for the desired reaction on the brake linkage, which of course will be an extent dependent upon the momentum of the vehicle and the reaction of the wheel brakes on their drums, and other factor. The cushioning means 25 then permit a further depression of the pedal without any added pressure on the power brake clutch in proportion to the amplitude of motion of the pedal, but results in permitting a substantial range of motion of the foot without directly increasing in the same proportion the effectiveness of the power brake, but rather it permits what is termed "feeling" the results of the motion as to the resulting car-braking effect. By permitting a substantial movement of the foot, that is the brake pedal, a cushioning with respect to the actuation of the power brake provides for "feeling" the control of retardation of the car, and at the same time permits the full application of force whenever desired to the cams 7 in order to instantly secure when desired the maximum force of application of the brake linkage from the power brake.

It will be noted, particularly from Fig. III, that when the car is moving backward the friction clutch will turn the hub in the opposite direction from that due to the force or turning moment when the car is moving forward. While the return-springs 21 pull the sector and brake rod levers and also the cables 12, to cause hub 4 to assume a central position, the rearward movement of the car first turns the hub part of a revolution, which may be seventy or eighty degrees before the pull on the cable starts to apply the wheel brakes. Taking up this slack might permit a back rolling of the car a short distance before the car can be stopped, and for various reasons and in many conditions of operation or in many types of cars, it becomes desirable to prevent even any slight rearward motion before the brakes definitely hold. Therefore I provide in conjunction with the power brake a back roll stop, which, as shown, is embodied preferably adjacent the power brake and in conjunction with the same housing that supports parts of the power brake. This back roll stop may be substantially as shown in my co-pending patent application Serial No. 649,890 filed January 3, 1933 which has become Patent No. 2,038,986 granted April 28, 1936. As herein illustrated, this is an automatic back roll stop comprising a cam ring 30, which through a series of rollers 31 locks a cylindrical bearing 32, which is splined to shaft E', which parts cooperate the moment shaft E tends to turn backward, due to the tendency of the car to roll backward after it has stopped on a hill. It thus comprises an automatic back rolling stop which positively holds the car from rolling backward at all. When so functioning and it is desired to permit the car to roll backward, or to drive the car rearward, a connection 33ª from the reverse speed control of the transmission moves by voluntary action a fork 33ᵇ which engages a collar 33 on a floating ring 34, moving the latter laterally against the pressure of spring 35 so that the inner surface of the floating ring 34 releases the pressure on a series of balls 36', permitting them to move radially and disconnect or unlock the cam ring 30 from a fixed member or cam carrier 36, which is a rigid part locked to the housing and which contains projections or abutments, indicated by dotted reference 37 adjacent the rollers 31, whereby the locking of cam ring 30 and the ring 32 on the shaft is instantly released, all of which construction is set forth in my co-pending application above referred to as putting the automatic back roll stop out-of-functioning position. Thereupon the car is allowed to start gently rolling backward, but this only occurs when it is desired and when it is safe to permit the car to start rolling backward, and under those conditions the slack is taken up in the fractional rotation of the hub 4 and the pull on the cables 12, putting them in condition so that thereupon should it be desired to retard the backward movement of the car the voluntary application of force on the brake pedal 24 then instantly causes the power brake to start functioning.

Conversely, when the car is moving forward the first slight application by foot pedal pressure takes up the slack for the forward turning of the hub 4, and then magnifies the power transmitted to the brake-rigging while the car is moving forward, resulting in the normal and gradual or quick application, as desired, of all the predetermined power brake force on the brake linkage.

Thus the conditions of starting to roll back, and the required application of brakes, or the application of brakes when the car is driving forward, are all perfectly accommodated by the combination of my power brake mechanism with the automatic back roll stop.

As shown in Fig. III, the hub 4 normally has the cables 12 in tension, which is due to the return-springs 21, but in order to apply the rotative moment to put strain on the cables 12 a slack must be taken up which turns the hub 4 into a position where the cable is shown as 12' in dotted line, so that the predetermined force is applied to the cables. In that position the cables are partially wrapped around the circumference of the hub 4, and the tension is substantially or close to a tangential position with respect to hub 4, and the sheave on the sector 15 is flared in order to accommodate the slight angular deflection. It will be noted that after the car comes to rest, provided the brakes are relieved, springs 21 cause cables 12 to bring the hub back into central position. It is thereafter an easy movement with the forward movement of the car and slight friction at the disc 33, to take up the slack, but if brake application for rearward drive is desired it becomes an item because rearward motion of the car starts from zero and is slow, but conditions of car control occasionally or frequently require that brake application should be effected quickly. Therefore the emergencies thus involved are accommodated by the automatic back roll stop, and the operator of the car can release it to permit back rolling when he is assured that there is ample room for back rolling, and sufficient in order that the slack is taken up in the fractional rotation of hub 4, in order to put the cables 12 in tension for the application of brakes by the power mechanism or power brake connections, due to voluntarily down-pedalling and actuating the cams 7.

It will be noted that Fig. VI shows a construction which operates as hereinbefore particularly described, except that flange 1 is changed to a cone clutch member 40 to engage with a co-operating clutch surface 41 rigidly associated with hub 4. The angularity of the clutch faces must be non-freezing, and may be so designed above twelve and a half degrees, and preferably nearer seventeen degrees, in order to effect a gradual and thereafter positive holding when the car is stationary. The cone clutch surfaces may be varied at will for gentle initial friction, and in other respects is designed to suit particular conditions which greatly vary with respect to heavy road vehicles compared with light.

In Fig. VII the brake lining 3 of Fig. 1 on the flange 2 is modified as an outer annular friction member 47 fixed to the flange 2, while an inner annular member 45 or as a portion of 47 is keyed to flange 2 but spring-pressed by spring 46, so that its face engages the flange 1 on the driven shaft to cause a slight drag because of its smaller diameter of effective friction surface, and thereby causes a gradual turn on the housing 2 in order to take up the slack in the cables 12, until full pressure by the cam 7 forces a contact of the annular friction surfaces 3, or in this case the annular portions 47, whereupon the full turning moment of engagement with the driven shaft becomes effective but without any shock, upon the cables and therefore is gradually transmitted to the brake-rigging.

While I have shown various features of construction which provide an effective, simple and reliable construction, it will be understood that the proportions, that is the dimensions of the various parts permit of definite determination of the relatively slight pressure desired for brake-pedal operation, in order to apply the desired brake-bar-pull and the desired force of each brake. As for example, in the form generally as illustrated, pedal pressure rising gradually to a maximum of thirty pounds is made effective to the extent of the self-energizing brakes on each wheel being applied with a force of five hundred and fifty pounds, allowing for the usual co-efficient of friction of the power brake clutch surface, and the relative lengths of the levers or rocker arms.

With the inclusion of the automatic roll back stop, conditions of back rolling or braking are accommodated which may minimize or omit the necessity of power braking for rearward motion of the car, in which case the features of my invention apply particularly to the essential of the braking system, namely, the control when the car is moving forward, though being the condition when the powerful application of the wheel brakes is of vital importance. When desired therefore the features of construction may serve for power brake mechanism for forward drive alone, and with any of the other usual braking connections being made effective for the conditions of back rolling or rearward driving which is always relatively at slow speed, and not demanding the primary conditions for which the power brake functioning is needed.

It is to be understood that power brakes in general exist and have been suggested in various forms, but that their relatively complicated form of construction, question of their durability or certainty of action, or cost of production, are such that it will be seen that what is herein shown and described is of a utility representing an advance in the art, although work has been done by others, and without restriction to the particular embodiment of my invention specifically shown, but what I claim and desire to secure by Letters Patent is:

I claim:

1. In an automobile, a power brake or brake amplifying means coordinated with the mass of the car effective through a transmission shaft and having a slack action when the car starts to roll backward, in combination with an automatic back roll stop to prevent the automobile from starting to roll backward, automatically set after forward motion, means for setting the power brake for functioning but without setting the brakes while the back-roll-stop is set, means for releasing the back roll stop and to permit slow rearward starting, without shock, in view of the inertia of back movement of the car to gradually absorb the slack action in the power brake.

2. In an automobile, a power brake having a fractionally rotatable sleeve or hub, a friction brake responsive to the momentum of motion of the car for delivering a turning moment on said sleeve, two diametrically attached tension members connected to said sleeve having a smaller radius of application than the friction brake and actuated by the fractional turning movement of said sleeve, means for holding said tension members in neutral position when the brakes are not actuated, means for gradually absorbing the slack in the transmission of power to said tension members upon the voluntary energizing of the friction clutch, means for automatically preventing the starting of rearward rolling of the car, so constructed and arranged whereby voluntary release of the arresting means for rearward motion of the car permits of the gradual application of the friction brakes.

3. In a motor car control means, the combination with suitable brake-rigging or linkage, frictional means to transmit power due to the momentum of the car when in motion to actuate the brake-rigging, means to set the same to function, connections to actuate the same adapted upon rearward rolling of the car to gradually apply the brakes after slight rearward movement of the car, an automatic back-roll instantly locking means and means for automatically causing the same to shift into functioning position after forward movement of the car, so constructed and arranged whereby the car will automatically at all times be brought to a stop before starting to roll back on an incline, and thereafter said setting means may be applied and upon voluntary release of the back-roll stop the power brake will be automatically set to function after the first slight rearward movement of the car.

4. In combination in a motor car, brake-rigging and linkage, a coordinated back-roll locking mechanism and a servo brake for actuating the brake-rigging by slight manual voluntary pressure, means for automatically setting the back-roll lock to function upon forward rolling of the car, voluntary means to release the back-roll lock to instantly permit rearward movement of the car, voluntary means for setting the servo brake actuating means so constructed and arranged whereby the servo brake force will be gradually applied after release of the back-roll lock during a predetermined slight rearward rolling of the car.

5. In a motor car, a plurality of wheel brakes and linkage therefor, a servo actuating mechanism, a back-rolling stop adapted to lock the car against starting to roll back set to function by automatic shifting when the car is running forward, coordinated with the servo mechanism adapted to be set when the roll-back-stop locks the car and means thereafter automatically causing the servo-mechanism to apply the brakes, whereby upon voluntary release of the back-roll lock the initial rearward rolling of the car effects a gradual application of power to the brake-linkage.

6. A self-propelled vehicle having a servo-brake operating mechanism including a hub with tension members actuating at a predetermined radius, friction clutch members transmitting power from the momentum of a car at a greater diameter than the tension members, a lever connected with the normal brake-rigging of the vehicle, roll-back stop mechanism adapted to prevent the car from starting to roll back and having means for automatic functioning after the car has rolled forward, so constructed and arranged whereby the voluntary setting of the servo brake mechanism will cause gradual application of the friction brakes upon voluntary release of the back-roll stop.

7. In an automobile brakes and brake-rigging, a servo-brake actuating mechanism including a rotatable hub, brake actuating tension members attached to said hub, momentum friction surface of greater diameter than the hub, whereby the power delivered by the momentum of the motion of the car is multiplied in the turning moment of the hub, means for holding said tension members in neutral position, and a cooperating friction surface on the servo member effective to cause an initial drag to take up the slack in said tension members, whereby the application of the brake power is gradual after voluntary application, in combination with a back-roll stop locking the car to prevent its starting to roll back, and when voluntarily released permitting the gradual application of the brakes through the servo-member.

8. In a self-propelled vehicle, the combination of coordinated means to prevent by automatic action the starting of the vehicle to roll backward, servo brake mechanism, an actuator therefor, and means for direct setting thereof by the operator, means from the servo mechanism to actuate brake-rigging for the application of the vehicle brakes, means to normally keep the servo mechanism out-of-functioning and means whereby upon the release of the back-roll stop and voluntary setting of said servo mechanism actuator causes a gradual application of the brake power upon the car starting to roll back.

9. In a self-propelled vehicle, the combination of an automatic back-roll-stop preventing the vehicle from starting to roll back, automatic means to set the back-roll-stop for functioning at all times of forward rolling of the vehicle, and voluntary means for negativing the functioning of the back-roll-stop whereby the car is free to start back rolling, a power brake and means therefor to actuate the brakes having a slack period before starting said brakes to function when the vehicle starts to roll backward, and voluntary means to set said power brake when the back-roll-stop is functioning, whereby the release of the back-roll-stop causes the power brake to take up its slack on the first rolling back of the car and effect the braking of the car upon a predetermined back rolling.

10. In a self-propelled vehicle, the combination of an automatic back-roll-stop preventing the vehicle from starting to roll back, automatic means to set the back-roll-stop for functioning at all times of forward rolling of the vehicle, a power brake, brakes actuated by brake rigging having a slack period before starting to function, means to instantly and completely release the back-roll-stop and voluntary means to set the power brake, whereby upon the car starting to roll back a predetermined amount the brakes automatically function.

11. In a self-propelled vehicle, the combination of an automatic back-roll-stop effective to stop the car from starting to roll backward on an incline, brakes, a power brake actuating means adapted to be set for action while the roll-back-stop holds the car, and thereafter upon the release of the back-roll-stop to gradually and automatically apply said brakes upon release of the automatic back-roll-stop and to hold the car after a predetermined backward rolling.

12. In combination in an automobile control mechanism, a back-roll-stop automatically set for functioning and functioning instantly when the car tends to roll back but before rolling back, a friction brake, a servo brake, voluntary means to set the same and cause actuating mechanism to automatically apply said brakes when the car starts to roll back from a state of rest, means for voluntarily releasing the back-roll-stop while permitting the preliminary setting of the servo brake, whereby the release of the car permitting its back roll gradually applies the friction brake.

13. Motor car control mechanism having in combination a roll-back-stop automatically setting and functioning to prevent the car from starting to roll back, friction brakes and servo means to actuate the same by the force of the mass of the car tending to roll down hill, means for voluntary setting of the brake actuating means while the roll-back-stop is functioning to hold the car stationary on an incline, means to instantly release the back-roll-stop, said servo means having intermediate connections to the friction brakes permitting a predetermined interval of back rolling of the car precedent to the holding of the car stationary by the friction brakes.

LINDSAY H. BROWNE.